US011321664B2

(12) United States Patent
Li et al.

(10) Patent No.: US 11,321,664 B2
(45) Date of Patent: May 3, 2022

(54) LOGISTICS APPARATUS AND METHOD FOR IDENTIFYING EMPTY/FULL STATE OF LOGISTICS APPARATUS

(71) Applicant: SHANGHAI HONGYAN RETURNABLE TRANSIT PACKAGINGS CO., LTD., Shanghai (CN)

(72) Inventors: Bo Li, Shanghai (CN); Qingxin Liao, Shanghai (CN); Yiwen Cao, Shanghai (CN)

(73) Assignee: SHANGHAI HONGYAN RETURNABLE TRANSIT PACKAGINGS CO., LTD., Shanghai (CN)

( * ) Notice: Subject to any disclaimer, the term of this patent is extended or adjusted under 35 U.S.C. 154(b) by 103 days.

(21) Appl. No.: 16/626,783

(22) PCT Filed: May 31, 2018

(86) PCT No.: PCT/CN2018/089268
§ 371 (c)(1),
(2) Date: Dec. 26, 2019

(87) PCT Pub. No.: WO2019/001213
PCT Pub. Date: Jan. 3, 2019

(65) Prior Publication Data
US 2020/0118065 A1 Apr. 16, 2020

(30) Foreign Application Priority Data

Jun. 26, 2017 (CN) .......................... 201710496583.5

(51) Int. Cl.
H04W 4/80 (2018.01)
G06Q 10/08 (2012.01)
(Continued)

(52) U.S. Cl.
CPC ........... *G06Q 10/087* (2013.01); *B65D 21/04* (2013.01); *G06K 17/0029* (2013.01);
(Continued)

(58) Field of Classification Search
CPC ...... G06Q 10/087; G06Q 10/30; G06Q 50/28; H04W 4/80; B65D 21/04; B65D 21/045;
(Continued)

(56) References Cited

U.S. PATENT DOCUMENTS 8,502,671 B2 * 8/2013 Marcovici .............. B65D 83/04
340/572.8
2018/0041501 A1 * 2/2018 Liao ..................... H04L 63/0853
(Continued)

FOREIGN PATENT DOCUMENTS

CA 2 982 515 10/2016
CN 1645424 7/2005
(Continued)

OTHER PUBLICATIONS

International Search Report and Written Opinion, International Patent Application No. PCT/CN2018/089268, with English translation of Search Report, dated Aug. 31, 2018 (13 pages).
(Continued)

Primary Examiner — Garcia Ade
(74) Attorney, Agent, or Firm — Hamre, Schumann, Mueller & Larson, P.C.

(57) ABSTRACT

The invention relates to the field of logistics, and discloses a logistics apparatus and a method for identifying empty/full state of the logistics apparatus, which efficiently and accurately realizes automatic recognition of empty and full state. The invention includes: a base and side plates at four sides; a foldable mechanism being provided between the base and each side plate so that the side plates can be folded toward the base; and a short-range wireless transmitter module and
(Continued)

a short-range wireless receiver module being respectively disposed on the base and at least one side plate; the short-range wireless transmitter module is configured to transmit a wireless signal indicating the identification of the logistics apparatus; and an arbiter, configured to determine whether the short-range wireless receiver module can currently receive the identifier transmitted by the short-range wireless transmitting module, and if yes, outputting an electrical signal indicating an empty state, otherwise, outputting an electrical signal indicating a full state.

4 Claims, 10 Drawing Sheets

(51) Int. Cl.
*B65D 21/04* (2006.01)
*G06K 17/00* (2006.01)
*G06Q 10/00* (2012.01)
*G06Q 50/28* (2012.01)
*H04B 1/034* (2006.01)

(52) U.S. Cl.
CPC .............. *G06Q 10/30* (2013.01); *G06Q 50/28* (2013.01); *H04B 1/034* (2013.01); *H04W 4/80* (2018.02)

(58) Field of Classification Search
CPC ........... B65D 2519/00592; B65D 2519/00641; B65D 2519/0094; B65D 21/064; B65D 2203/10; B65D 2519/00975; B65D 2519/00915; B65D 2519/00646; B65D 2519/00711; B65D 2519/00587; B65D 2519/00333; B65D 21/0209; B65D 2519/009; B65D 21/0233; B65D 2519/0096; B65D 19/06; B65D 19/38; B65D 25/00; B65D 2519/00875; B65D 2519/00965; B65D 2203/00; G06K 17/0029; G06K 7/10099; H04B 1/034; Y02W 90/00

USPC .......................................................... 705/28
See application file for complete search history.

(56) References Cited

U.S. PATENT DOCUMENTS

| | | | |
|---|---|---|---|
| 2018/0102795 A1* | 4/2018 | Liao | G06Q 10/08 |
| 2020/0118065 A1* | 4/2020 | Li | H04W 4/80 |
| 2020/0388124 A1* | 12/2020 | Liao | G08B 13/1895 |

FOREIGN PATENT DOCUMENTS

| | | |
|---|---|---|
| CN | 1787024 | 6/2006 |
| CN | 204024235 U | 12/2014 |
| CN | 104835023 A | 8/2015 |
| CN | 106382969 A | 2/2017 |
| CN | 206193817 U | 5/2017 |
| CN | 107140282 A | 9/2017 |
| CN | 207015763 U | 2/2018 |
| DE | 202011005661 U1 | 9/2011 |
| EP | 3 285 215 | 2/2018 |
| JP | 11-020864 | 1/1999 |
| JP | 2014-044607 | 3/2014 |
| JP | 2015-147607 | 8/2015 |
| WO | 2011/020154 | 2/2011 |
| WO | 2016/138876 | 9/2016 |
| WO | 2016/165609 | 10/2016 |

OTHER PUBLICATIONS

Extended European Search Report issued in corresponding European Patent No. 18825543.4, dated Feb. 12, 2021, 6 pages.
Examination Report issued in corresponding Australian Patent Application No. 2018295149, dated Nov. 5, 2020, 7 pages.
Office Action issued in corresponding Japanese Patent Application No. 2019-571652, dated Mar. 2, 2021, 14 pages with an English Translation.

* cited by examiner

Empty State   Full State

Empty State   Full State

LOGISTICS APPARATUS AND METHOD FOR IDENTIFYING EMPTY/FULL STATE OF LOGISTICS APPARATUS

TECHNICAL FIELD

The present invention relates to the field of logistics, and more particularly to a method for identifying empty/full state of the logistics apparatus.

BACKGROUND

In order to save resources of society and reduce cost of logistics, recyclable logistics apparatus has been emerged for shared use by merchants in need. In order to realize better scheduling of logistics apparatus, it is necessary to know the location and empty/full state of each logistics apparatus. At present, the technology to achieve locating of each logistics apparatus is relatively mature, but how to easily and reliably determine whether each logistics apparatus is in an empty state or a full state is still a challenge. A common method is to manually register and troubleshoot, but it is costly and inefficient.

SUMMARY

The object of the present invention is to provide a logistics apparatus and a method for identifying empty/full state of the logistics apparatus, which can efficiently and accurately realize automatic recognition of the empty/full state.

In order to solve the above technical problems, there is provided a logistics apparatus, comprising two structural states of a full state and an empty state, the logistics apparatus comprises:

a plurality of plates, combined to form a space for loading cargo in the full state and folded in a space-saving manner in the empty state;

the plurality of plates comprises a first plate provided with a first wireless transmitter module and a second plate provided with a wireless receiver module, such that, the linear distance of the first wireless transmitter module and the wireless receiver module is greater than D in the full state, and the linear distance of the first wireless transmitter module and the wireless receiver module is less than D in the empty state, wherein the D is the maximum effective communication distance of the first wireless transmitter module and the wireless receiver module;

wherein the first wireless transmitter module is configured to transmit a wireless signal indicating the identification of the logistics apparatus;

an arbiter, configured to determine whether the wireless receiver module currently receive the wireless signal, and if yes, outputting an electrical signal indicating an empty state, otherwise, outputting an electrical signal indicating a full state.

In a preferred embodiment, wherein the logistics apparatus is a foldable basket, the logistics apparatus comprises only four side plates, and the plurality of plates are side plates of the logistics apparatus.

In a preferred embodiment, wherein the logistics apparatus is a foldable basket or a medium-sized bulk container without lid, and the plurality of plates include a base and a plurality of side plates of the logistics apparatus; the first plate is one of the plurality of side plates of the logistics apparatus, and the second plate is the base of the logistics apparatus.

In a preferred embodiment, wherein the logistics apparatus is a medium-sized bulk container with a lid, and the plurality of plates include a base and the lid of the logistics apparatus; the first plate is the lid of the logistics apparatus and the second plate is the base of the logistics apparatus, or the first plate is the base of the logistics apparatus and the second plate is the lid of the logistics apparatus.

In a preferred embodiment, wherein the logistics apparatus is a medium-sized bulk container with a lid, and the plurality of plates includes the lid and a plurality of side plates of the logistics apparatus; the first plate is one of the plurality of side plates of the logistics apparatus, and the second plate is the lid of the logistics apparatus.

In a preferred embodiment, which further comprises:

a second wireless transmitter module, electrically coupled to the arbiter and configured to transmit the identification of the logistics apparatus and the signal of the empty or full state output by the arbiter to a cloud server.

In a preferred embodiment, wherein the first wireless transmitter module is a passive RFID tag, or an NFC tag, or an active RFID tag, or an ibeacon tag.

In a preferred embodiment, which further comprises a sensor module, an output port of the sensor module is electrically coupled to an input port of the second wireless transmitter module, and the information output by the sensor module is sent to the cloud server through the second wireless transmitter module.

In another exemplary embodiment, there is provided a method for identifying empty/full state of a logistics apparatus, wherein the logistics apparatus comprises two structural states of a full state and an empty state, the logistics apparatus comprises a plurality of plates which are combined to form a space for loading cargo in the full state and folded in a space-saving manner in the empty state; the plurality of plates comprises a first plate provided with a first wireless transmitter module and a second plate provided with a wireless receiver module, such that, the linear distance of the first wireless transmitter module and the wireless receiver module is greater than D in the full state, and less than D in the empty state, wherein the D is the maximum effective communication distance of the first wireless transmitter module and the wireless receiver module; the method comprises:

transmitting the identification of the logistics apparatus by the first wireless transmitter module;

determine whether the wireless receiving module can currently receive the identifier sent by the first wireless transmitting module, if it can be received, the state of the logistics apparatus is determined to be empty, otherwise the state of the logistics is determined to be full.

In a preferred embodiment, wherein the logistics apparatus further comprises a second wireless transmitter module; which further comprises:

transmitting the identification of the logistics apparatus and the signal of the empty or full state output by an arbiter to a cloud server by the second wireless transmitter module.

In another exemplary embodiment, there is provided a logistics apparatus, comprising:

physical mechanism for stacking, such that the logistics apparatus can be stacked in an empty state;

a wireless transceiver module, disposed on a base or a side plate or a lid of the apparatus and configured to transmit and receive a predestinate wireless signal;

an arbiter, configured to determine whether the wireless transceiver module currently receives the predestinate wireless signal from another logistics apparatus and if yes, outputting an electrical signal indicating an empty state, otherwise, outputting an electrical signal indicating a full state.

Wherein the maximum effective communication distance of the wireless transceiver module is S, and disposed position of the wireless transceiver module satisfies following conditions:

when multiple logistics apparatuses are stacked in the empty state, the linear distance between the wireless transceiver modules of two adjacent logistics apparatuses is less than s, when multiple logistics apparatuses are in the full state, the linear distance between the wireless transceiver modules of two adjacent logistics apparatuses is greater than S.

In a preferred embodiment, wherein the logistics apparatus is a conventional pallet, and the wireless transceiver module is disposed in a central portion at the bottom of the pallet.

In a preferred embodiment, wherein the logistics apparatus is a recyclable turnover box, or a reverse sleeve container without lid, or a basket with ring, or a nested pallet, the physical mechanism for stacking enables the logistics apparatus to be nested, and the wireless transceiver module is disposed at the center of the base of the recyclable turnover box.

In a preferred embodiment, which further comprises a third wireless transmitter module, which is electrically coupled to the arbiter and configured to transmit the identification of the logistics apparatus and the signal of the empty or full state output by the arbiter to a cloud server.

In another exemplary embodiment, there is provided a method for identifying empty/full state of a logistics apparatus, wherein the logistics apparatus is described above, and the method comprises following steps:

transmitting a predestinate wireless signal by the wireless transceiver module;

determining whether the wireless transceiver module can currently receive the predestinate wireless signal from another logistics apparatus, if it can be received, the state of the logistics apparatus is determined to be empty, otherwise the state of the logistics is determined to be full.

In a preferred embodiment, wherein the logistics apparatus further comprises a third wireless transmitter module; which further comprises:

transmitting the identification of the logistics apparatus and the signal of the empty or full state output by the arbiter to a cloud server by the third wireless transceiver module.

Compared with the prior art, the embodiments of the present invention have at least the following differences and effects:

The logistics apparatus is made into a mechanism in which the side plate can be folded toward the base plate, and a short-range wireless transmitter module and receiver module are respectively disposed on the side plate and the base of the logistics apparatus, which can easily determine the empty/full state of the logistics apparatus. There is no need to manually check the empty/full state of the recyclable logistics apparatus on the spot. The wireless receiver module will actively send data to a background cloud server after the apparatus is folded, and the background performs remote scheduling based on the empty/full state of the recyclable logistics apparatus, improving effective utilization of the recyclable logistics apparatus.

It can be understood that, within the scope of the present invention, the above technical features of the present invention and the technical features specifically described in the following (such as embodiments and examples) can be combined with each other to form a new or preferred technical solution. Limited to length, there will not been repeated.

DETAILED DESCRIPTION OF THE ILLUSTRATED EMBODIMENTS

In the following description, numerous technical details are set forth in order to provide the reader with a better understanding of the present application. However, those skilled in the art can understand that the technical solutions claimed in the present application can be implemented without these technical details and various changes and modifications based on the following embodiments.

The following is description of some concepts:

Effective communication distance refers to a wireless communication distance that information can be effectively transferred. It is not within an effective communication distance when a signal is too weak to analyze the information because of long distance between a transmitter module and a receiver module although the receiver module can detect the wireless signal transmitted by the transmitter module, RFID: Radio Frequency Identification.

NFC: Near Field Communication

Electrically coupled refers to connect two modules via a circuit to transfer signals. The two modules can be directly connected or indirectly connected through another modules. For example, there may be an intermediate module such as a signal amplification module or a noise filtering module between two electrically connected modules.

Stacked refers to stack multiple logistics apparatuses together in a vertical direction.

Nested refers to stack in a nested manner.

Figure 4:
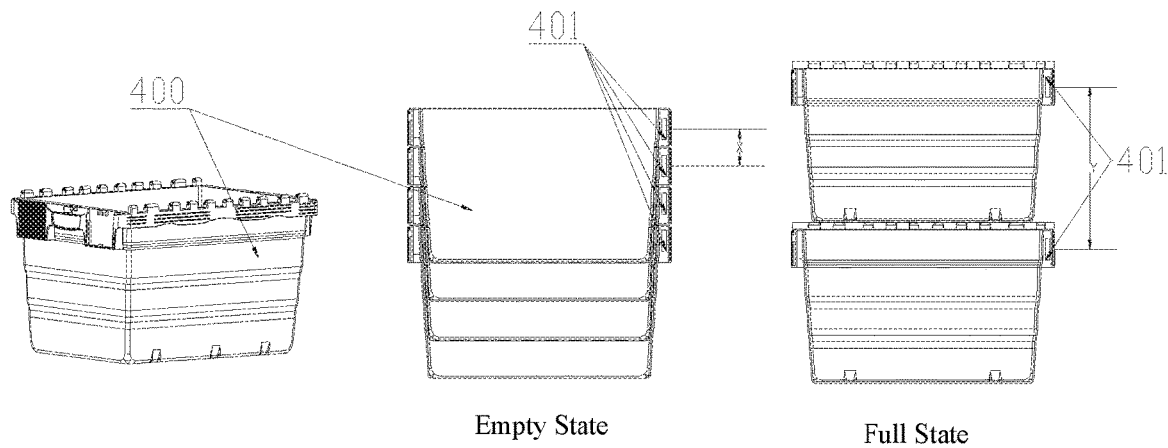
FIG. 4 schematically shows that logistics apparatuses are stacked in an empty state and a full state according to a third embodiment of the present invention.

Stacked in empty state refers to stack logistics apparatuses in the empty state, that is, stacking in a space-compressed manner in the case of the empty state. The Stacked in empty state includes nested. Generally, the logistics apparatuses can be stacked in full state or in empty state, but their stacking methods are different. For example, for logistics turnover boxes, they can be stacked in nested manner after removing lids to save space in the empty state, while they can only be simply stacked in the full state (as shown in FIG. 4) because of existing of the lids. For another example, for pallets, they can be directly stacked in the empty state, and the distance between the upper and lower adjacent pallets is relatively close; the distance between the two adjacent pallets in the full state will be far even if stacked because there will be other cargo.

Empty state refers to the state when the logistics apparatus is not loaded with cargo, and full state refers to the state when the logistics apparatus is loaded with cargo. These two states can be applied to various logistics apparatuses, not specifically states of box-shaped logistics apparatuses.

IBC: Intermediate Bulk Container, also known as container bucket, composite medium bulk container. It is an indispensable tool for modern storage and transportation of liquid cargo. The container bucket consists of an inner container and a metal frame. The inner container is blow-molded with high molecular weight and high-density polyethylene, which has high strength, corrosion resistance and good hygiene.

The following is a summary of some of innovations of the application:

The original fixed-shape logistics apparatus is transformed into a foldable form, that is, a rotation mechanism is disposed between each side plate and a base, and the side plates on all sides can be folded toward the base. One advantage of this is that when there is no load the logistics apparatus can be folded to reduce occupied space. Based on foldable, a low-power short-range wireless transmitter module is disposed on a side plate, and a low-power short-range wireless receiver module is correspondingly disposed on the base. The transmitter module sends identification information of the logistics apparatus. If the receiver module can receive the identification, it means that the current logistics apparatus is in a folded state or in the empty state. If the receiver module cannot receive the identification, it can be determined that the logistics apparatus is in a non-folded state or in the full state (the apparatus after unloaded must be folded to save space). The effective communication distance between the wireless transmitter module and the wireless receiver module needs to be set carefully, so that the effective communication distance is less than linear distance between the wireless transmitter module and the wireless receiver module in the full state, and the effective communication distance should be greater than the linear distance between the wireless transmitter module and the wireless receiver module in the empty state. The low-power short-range transmitter module and receive module disposed on the base and the side plate of the logistics apparatus are bound in pair, and will not interfere with each other when the recyclable logistics apparatuses are stacked.

Another solution is to transform the logistics apparatus into a form that stacked in the empty state, and a physical mechanism for stacking in the empty state is disposed in each logistics apparatus. A low-power short-range wireless transceiver module is disposed in each logistics apparatus for transmitting or receiving predestinate wireless signal. If the wireless transceiver module of a logistics apparatus can receive predestinate wireless signal transmitted by other logistics apparatus, the logistics apparatus can be considered in the empty state, if it cannot receive the predestinate wireless signal transmitted by any other logistics apparatus, the logistics apparatus can be considered in the full state. There are certain requirements for design of the physical mechanism and position of the low-power short-range wireless transceiver module, that is, in the state that stacked in the empty state, the linear distance between the wireless transceiver modules of two adjacent logistics apparatuses should be less than the effective communication distance of the wireless transceiver module, while in the full state, the linear distance between the wireless transceiver modules of two adjacent logistics apparatuses should be greater than the effective communication distance of the wireless transceiver module. If a logistics apparatus is in the state that stacked in the empty state, it is considered to be in the empty state. A logistics apparatus in the full state cannot usually be stacked in the empty state. If a logistics apparatus is in the full state, it is considered to be in the full state. It is because the logistics apparatus comprises the physical mechanism for stacking in the empty state, so it is naturally to stack already empty logistics apparatuses in the empty state to reduce their occupied space. Therefore, the present application skillfully determines the empty/full state of the logistics apparatus through the physical mechanism for stacking in the empty state, and setting of the effective communication distance and the disposed position of the low-power short-range wireless transceiver module. Although it may not be able to determine 100% accurately, the accuracy rate is quite high under normal conditions, and it can already meet needs of scheduling of normal logistics.

The low-power short-range wireless transmitter module can be passive, such as a passive RFID tag or NFC tag. At this time, the low-power short-range receiver module is essentially a tag reader. The receiver module emits radio waves when needing to read, and the passive tag transmits the identification information of the logistics apparatus under the induction of the radio wave. The advantage of using passive tags is that no additional power is required on the side plate. Of course, the low-power short-range wireless transmitter module can also be active.

In order to make the objects, technical solutions and advantages of the present application clearer, embodiments of the present application will be further described in detail below with reference to the accompanying drawings.

The first embodiment of the present application relates to a logistics apparatus. The logistics apparatus comprises a plurality of plates that can be folded (including side plates, base, lid plate, etc.), and comprises two structural states, a full state and an empty state. The plurality of plates are combined to form a space for loading cargo in the full state and folded in a space-saving manner in the empty state. In at least two of the plurality of plates (hereinafter referred to as a first plate and a second plate), a first wireless transmitter module and a wireless receiver module are respectively provided. The linear distance of the first wireless transmitter module and the wireless receiver module is greater than D in the full state, and the linear distance of the first wireless transmitter module and the wireless receiver module is less than D in the empty state, wherein the D is the maximum effective communication distance of the first wireless transmitter module and the wireless receiver module.

The first wireless transmitter module is configured to transmit a wireless signal indicating the identification of the logistics apparatus;

The logistics apparatus further comprises:

an arbiter, configured to determine whether the wireless receiver module currently receive the wireless signal, and if yes, outputting an electrical signal indicating an empty state, otherwise, outputting an electrical signal indicating a full state.

Optionally a second wireless transmitter module, electrically coupled to the arbiter and configured to transmit the identification of the logistics apparatus and the signal of the empty or full state output by the arbiter to a cloud server.

The foldable logistics apparatus can be realized in various forms, four embodiments are given below.

Embodiment 1, Foldable Logistics Apparatus-Foldable Basket

Figure 1:
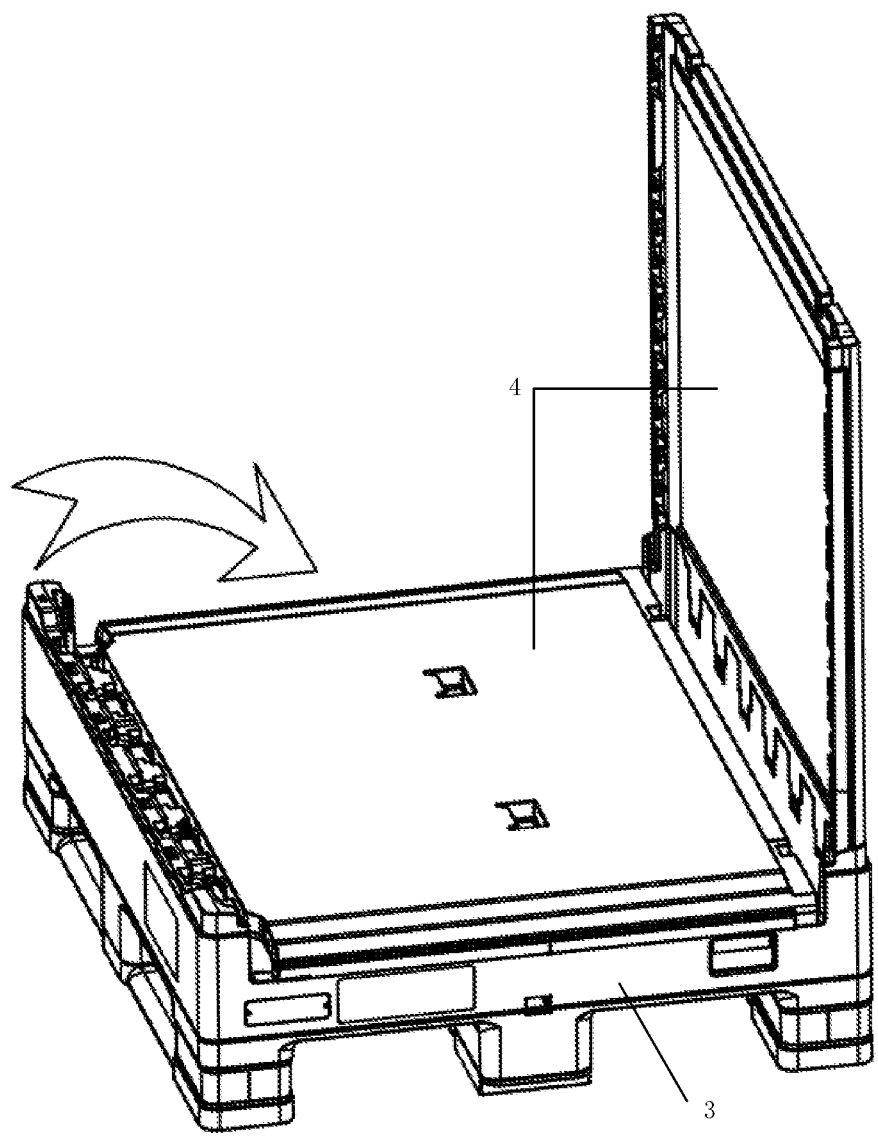
FIG. 1 schematically shows a folded manner of a logistics apparatus according to a first embodiment of the present invention.

As shown in FIG. 1, the logistics apparatus comprises:

a base 3 and side plates 4 at four sides.

A folding mechanism is provided between the base and each side plate, such that each side plate can be folded toward the base. There are two states of the side plates, including a folded state and an unfolded state. FIG. 1 is a schematic diagram showing a state in which some side plates are folded and others are unfolded, for helping understand how the side plates are folded. In one embodiment, the logistics apparatus comprises a top lid. In one embodiment, the top lid of the logistics apparatus can be folded relative to the side plate. In one embodiment, the top lid of the logistics apparatus is removable. In one embodiment, the logistics apparatus does not include the top lid.

The base and at least one of the side plates are respectively provided with a first wireless transmitter module 1 and a wireless receiver module 2. The maximum effective communication distance between the first wireless transmitter module and the wireless receiver module is D. The linear distance X between the first wireless transmitter module and the wireless receiver module is greater than D in the unfolded state of the side plate, and the linear distance Y between the first wireless transmitter module and the wireless receiver module is less than D in the folded state of the side plate. In one embodiment, the wireless transmitter module is disposed on the side plate, and the wireless receiver module is disposed on the base. In another embodiment, the wireless transmitter module is disposed on the base, and the wireless receiver module is disposed on the side plate. In each embodiment of the present application, disposed on the base includes inside of the base, and also includes surface of the base (for example, the wireless module is fixed to the inner or outer surface of the base by means of paste), similarly, disposed on the side plate includes inside of the side plate and also surface of the side plate (for example, the wireless module is fixed to the inner surface or the outer surface of the side plate by means of paste). Similarly, disposed on the top lid includes inside of the top lid, and also includes surface of the top lid (for example, the wireless module is fixed to the inner surface or the outer surface of the top lid by means of a paste).

The first wireless transmitter module is configured to transmit a wireless signal indicating the identification of the logistics apparatus. In one embodiment, the first wireless transmitter module is a passive RFID tag or an NFC tag. In another embodiment, the first wireless transmitter module is an active RFID tag or an ibeacon tag.

An arbiter, configured to determine whether the wireless receiver module can currently receive the identification transmitted by the first wireless transmitter module, and output an electric signal indicating the empty state if it can receive, otherwise output an electric signal indicating the full state. In one embodiment, the electrical signal may be a simple high/low level, one level indicates the empty state, and the other level indicates the full state. In one embodiment, the electrical signal may be an analog signal, which indicates the empty state when exceeding a preset level or the full state when is lower than the preset level. In one embodiment, the electrical signal may be a coded digital signal sequence, which respectively indicates the empty or full state with different codes.

A second wireless transmitter module, electrically coupled to the arbiter and configured to transmit the identification of the logistics apparatus and the signal of the empty or full state output by the arbiter to a cloud server. In one embodiment, the second wireless transmitter module is a communication module based on a cellular mobile system (such as a 3G, 4G, or 5G communication system). The second wireless transmitter module sends information to a base station, and the base station transfers the information to the cloud server. In one embodiment, the second wireless transmitter module is a Bluetooth module, the second wireless transmitter module establishes a connection with a nearby mobile phone, and sends the information to the cloud server through the mobile phone. In one embodiment, the second wireless transmitter module is a WIFI module, and the second wireless transmitter module sends information to an access point of the WIFI, and forwards the information to the cloud server through the access point.

A sensor module, an output port of the sensor module is electrically coupled to an input port of the second wireless transmitter module, and the information output by the sensor module is sent to the cloud server through the second wireless transmitter module. The sensor module can be a temperature sensor, a humidity sensor, an air pressure sensor, an acceleration sensor, a gyroscope, and so on. In a logistics apparatus, there may be one or more than one sensor modules, but of course there may be none.

A location module, electrically coupled to the second wireless transmitter module and configured to obtain the current location information of the logistics apparatus and send the location information to the cloud server through the second wireless transmitter module. In this way, the cloud server can obtain the current location of each logistics apparatus, which is convenient for scheduling. In another embodiment, the location module may not be provided. The second wireless transmitter module is coupled to a smart mobile terminal (such as a smart phone) through a communication method such as Bluetooth or WIFI. After received the information sent by the second wireless transmitter module, the smart mobile terminal reports the received information and its own location information (obtained by GPS or WIFI location, etc.) to the cloud server. The reported self-location information can be approximately regarded as the location information of the logistics apparatus because the smart mobile terminal is in the vicinity of the logistics apparatus when forwarding the information.

The logistics apparatus is made into a mechanism in which the side plate can be folded toward the base plate, and a short-range wireless transmitter module and receiver module are respectively disposed on the side plate and the base of the logistics apparatus, which can easily determine the empty/full state of the logistics apparatus.

In one embodiment, the first wireless transmitter module is powered by a coin cell battery. The wireless receiver module is powered by a lithium battery. Of course, there are many ways to supply power, as long as sufficient power can be provided to the wireless transmitter module and the wireless receiver module, and they can ensure that they have a sufficient working time.

Embodiment 2, Foldable Logistics Apparatus-IBC with a Lid

Figure 11:
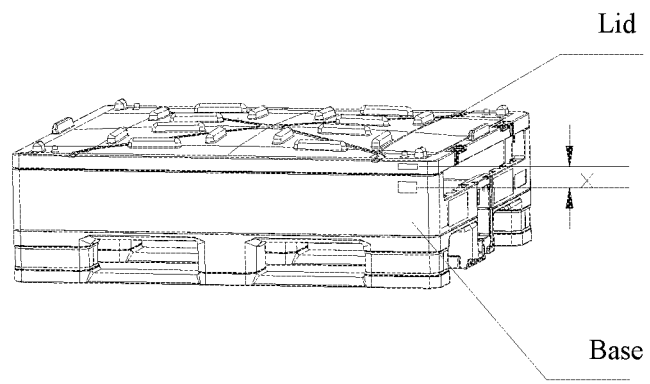
FIG. 11 schematically shows the empty and full state of a foldable container in which a wireless transmitter module and receiver module is respectively disposed on a lid plate and a base according to the second embodiment of the present invention.
Figure 11:
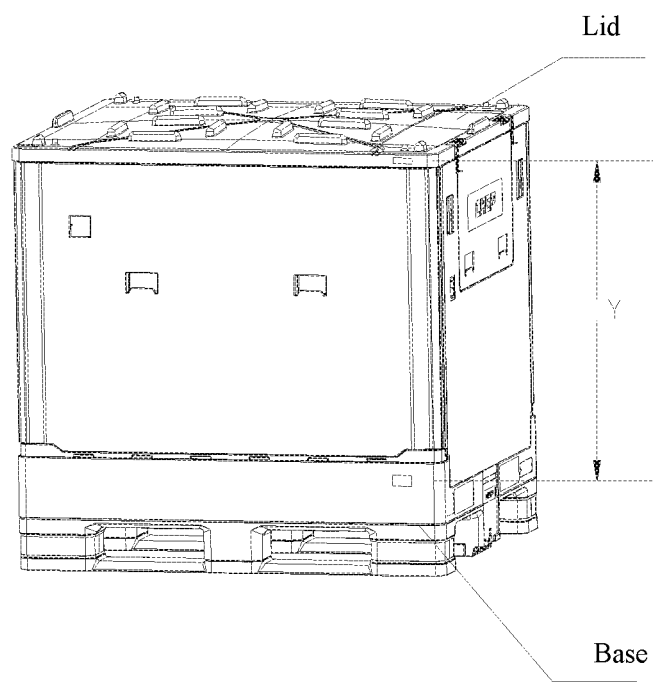

The logistics apparatus is shown in FIG. 11. The upper half of FIG. 11 is a schematic diagram of folded state (empty state), and the lower half is a schematic diagram of non-folded state (full state). The basic principle of embodiment 2 is basically the same as that of embodiment 1 (the differences are mainly discussed here, and many details are not repeated here). The main difference is that in embodiment 2 the first wireless transmitter module is disposed on the lid plate and the wireless receiver module is disposed on the base; in embodiment 1, the first wireless transmitter module is disposed on the side plate, and the wireless receiver module is disposed on the base. In another embodiment, the first wireless transmitter module is disposed on the base, and the wireless receiver module is disposed on the lid plate.

It can be seen in FIG. 11 that, the distance between the first wireless transmitter module disposed on the lid plate and the wireless receiver module disposed on the base is relatively close (set the distance to X) in the empty state; the distance between the first wireless transmitter module provided in the lid plate and the wireless receiver module disposed on the base is relatively long (set the distance to Y) in the full state; and X<D<Y, wherein D is the maximum effective communication distance between the first wireless transmitter module and the wireless receiver module.

Embodiment 3, Foldable Logistics Apparatus-IBC with a Lid

Figure 12:
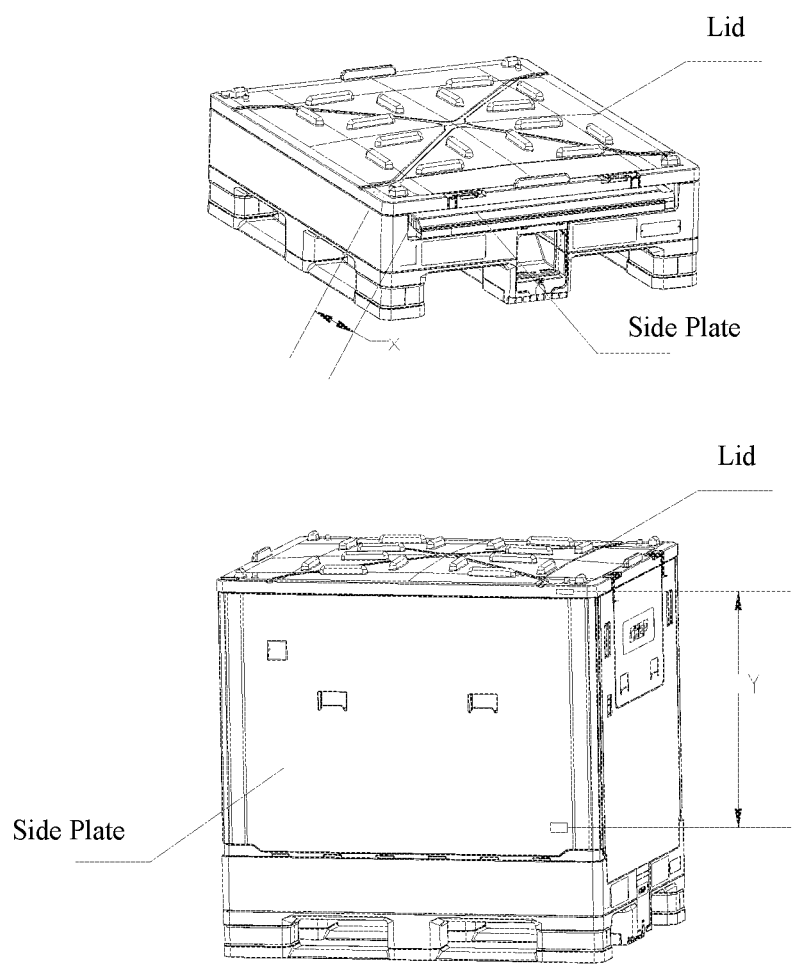
FIG. 12 schematically shows the empty and full state of a foldable container in which a wireless transmitter module and receiver module is respectively disposed on a lid plate and a side plate according to the second embodiment of the present invention.

The logistics apparatus is shown in FIG. 12. The upper half of FIG. 12 is a schematic diagram of folded state (empty state), and the lower half is a schematic diagram of non-folded state (full state). The basic principle of embodiment 3 is basically the same as that of embodiment 1 (the differences are mainly discussed here, and many details are not repeated here). The main difference is that in embodiment 3, the first wireless transmitter module is set in the side plate, and the wireless receiver module is set in the lid plate; in embodiment 1, the first wireless transmitter module is disposed on the side plate, and the wireless receiver module is disposed on the base. In another embodiment, the first wireless transmitter module is disposed on the lid plate, and the wireless receiver module is disposed on the side plate.

It can be seen in FIG. 12 that, the distance between the first wireless transmitter module disposed on the side plate and the wireless receiver module disposed on the lid is relatively close (set the distance to X) in the empty state; the distance between the first wireless transmitter module provided in the side plate and the wireless receiver module disposed on the lid is relatively long (set the distance to Y) in the full state; and X<D<Y, wherein D is the maximum effective communication distance between the first wireless transmitter module and the wireless receiver module.

Embodiment 4, Foldable Logistics Apparatus-Foldable Basket

Figure 13:
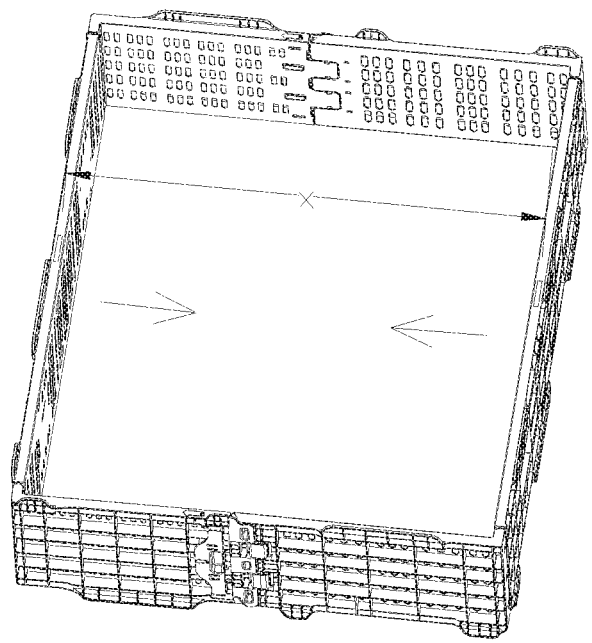
FIG. 13 schematically shows the empty and full state of a foldable basket according to the second embodiment of the present invention.
Figure 13:
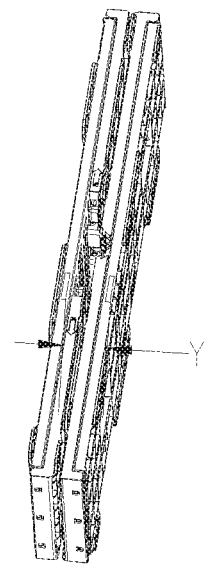

This logistics apparatus is shown in FIG. 13. The upper half of FIG. 13 is a schematic diagram of non-folded state (full state), and the lower half is a schematic diagram of folded state (empty state). The basic principle of embodiment 4 is basically the same as that of embodiment 1 (the differences are mainly discussed here, and many details are not repeated here). The main difference is that in embodiment 4, the first wireless transmitter module and the wireless receiver module are respectively disposed on two different side plates (diagrams show they are disposed on two opposite side plates respectively, in other embodiments, they can also be disposed on two adjacent side plates); and in embodiment 1, the first wireless transmitter module is disposed on the side plate, the wireless receiver module is set in the base.

It can be seen in FIG. 13 that, the distance between the first wireless transmitter module disposed on the lid plate and the wireless receiver module disposed on the base is relatively close (set the distance to X) in the empty state; the distance between the first wireless transmitter module provided in the lid plate and the wireless receiver module disposed on the base is relatively long (set the distance to Y) in the full state; and X<D<Y, wherein D is the maximum effective communication distance between the first wireless transmitter module and the wireless receiver module.

Figure 2:
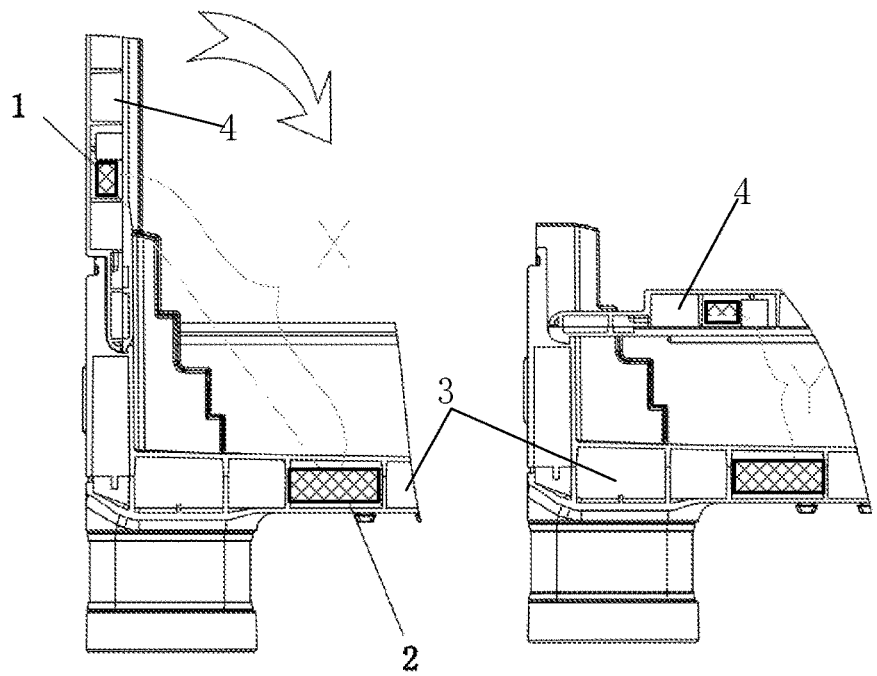
FIG. 2 schematically shows mechanisms before and after folding according to the first embodiment of the present invention.
Figure 3:
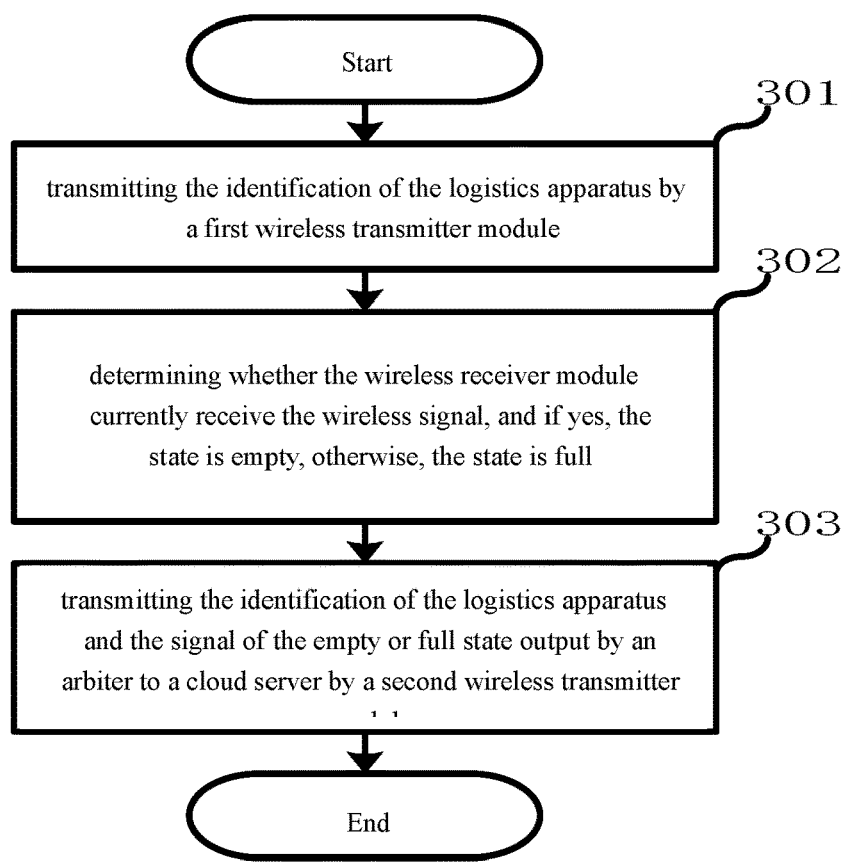
FIG. 3 is a schematic flowchart of a method for identifying empty/full state of a logistics apparatus according to a second embodiment of the present invention.

The second embodiment of the present invention relates to a method for identifying empty/full state of a logistics apparatus. FIG. 2 is a schematic flowchart of the method for identifying empty/full state of a logistics apparatus. The logistics apparatus comprises two structural states, a full state and an empty state. The logistics apparatus comprises a plurality of plates, which are combined to form a space for loading cargo in the full state and folded in a space-saving manner in the empty state; the plurality of plates comprises a first plate provided with a first wireless transmitter module and a second plate provided with a wireless receiver module, such that, the linear distance of the first wireless transmitter module and the wireless receiver module is greater than D in the full state, and the linear distance of the first wireless transmitter module and the wireless receiver module is less than D in the empty state, wherein the D is the maximum effective communication distance of the first wireless transmitter module and the wireless receiver module. In addition, the logistics apparatus also comprises a second wireless transmitter module.

The method comprises the following steps:

In step 301, transmitting the identification of the logistics apparatus by the first wireless transmitter module, After that, the method proceeds to step 302, determining whether the wireless receiver module currently receive the wireless signal, and if it can be received, the state of the logistics apparatus is determined to be empty, otherwise the state of the logistics is determined to be full.

After that, the method proceeds to step 303, transmitting the identification of the logistics apparatus and the signal of the empty or full state output by an arbiter to a cloud server by the second wireless transmitter module. Preferably, the logistics apparatus may further comprises various sensors and location module, and the data output by the various sensors of the logistics apparatus and the location information obtained by the location module are sent to the cloud server together with the identification of the logistics apparatus and the state of the empty apparatus through the second wireless transmitter module. The cloud server can obtain the distribution and states of all logistics apparatuses after receiving the identification and empty/full state reported by each logistics apparatus, so that further scheduling can be conveniently performed.

The embodiment is a method embodiment corresponding to the first embodiment, and a variety of logistics apparatuses in the first embodiment can use the method described in the embodiment. The related technical details mentioned in the first embodiment are still valid in this embodiment, and in order to reduce repetition, details are not repeated here. Accordingly, the related technical details mentioned in the embodiment can also be applied in the first embodiment.

The method embodiment of the present invention can be implemented in software, hardware, firmware, and the like. Regardless of whether the present invention is implemented in software, hardware, or firmware, the instruction code can be stored in any type of computer-accessible memory (such as permanent or modifiable, volatile or nonvolatile, solid state or non-solid, fixed or replaceable media, etc.). Similarly, the memory may be, for example, Programmable Array Logic (PAL), Random Access Memory (RAM), Programmable Read Only Memory (PROM)), Read-Only Memory (ROM), Electrically Erasable Programmable ROM (EEPROM), Magnetic Disks, Optical Disks, Digital Versatile Discs (DVD) and so on.

In addition, based on the above embodiments, the application can be further improved. For example, location state detection devices can be disposed on the top and bottom of logistics apparatuses (such as turnover box) to detect whether there is another apparatus on the top or bottom. For example, a switch device can be connected or disconnected by pressure of corresponding structural of the logistics apparatus; transmission interfaces are disposed on the top and bottom of the logistics apparatus, and two apparatuses can be electrically connected through the transmission interface when stacked up and down; when multiple logistics apparatuses are stacked together, each logistics apparatus knows its relative location through the location state detection devices at the top and bottom, for example, the state of the location state detection device at the bottom of the lowest logistics apparatus is that no other logistics apparatus is detected (for example, the switch device is on), and the state of the location state detection device on the top of the lowest logistics apparatus is that other logistics apparatus has been detected (for example, the switch device is off); the lowest logistics apparatus periodically wakes up the sleeping logistics apparatus above it through the transmission interface connected to the upper logistics apparatus (in order to save power, logistics apparatuses are generally dormant until it is periodically awakened or woken up through the transmission interface), and transmits the information of the lowest logistics apparatus, and the upper logistics apparatus above it just wakes up to receive the information transmitted by the lowest logistics apparatus below and saves the received information; the upper logistics apparatus wakes up again the logistics apparatuses above it through the transmission interface, and transmits its own information and saved information; in this way, starting from the lowest logistics apparatus, waking up and uploading information through the transmission interface layer by layer, and finally summarizing the information of multiple stacked logistics apparatuses to the topmost logistics apparatus; The topmost logistics apparatus sends information of itself and all the logistics apparatuses stacked below it to the cloud server. The information transmission between various logistics apparatuses can use low-power short-range communication systems (such as Bluetooth, Zigbee, etc.), and the transmission of the topmost logistics apparatus and the cloud server can use high-power long-range communication systems (such as 3G, 4G, 5G, etc.). Because the topmost logistics apparatus is least affected by the loaded liquid cargo, it is best to transmit information to the cloud server. In addition, preferably, a solar cell can be disposed on the top of the logistics apparatus to store electric energy in the form of a capacitor or a rechargeable battery, which is exclusively used for high-power long-distance communication systems, and low-power short-range communication systems use independent built-in battery so that the built-in battery can be used for many years, greatly reducing maintenance costs. The topmost logistics apparatus does not need to transmit the information to the cloud server immediately after received the information from the logistics apparatuses below. It can wait until the charge of the capacitor or rechargeable battery charged by the solar cell to reach a certain threshold before transmitting.

The third embodiment of the present invention relates to a logistics apparatus. The logistics apparatuses referred to in this embodiment may be various, such as a recyclable logistics turnover box with side plate and top lid, or a logistics pallet approximately with only a base, etc.

The logistics apparatus comprises:

physical mechanism for stacking, such that the logistics apparatus can be stacked in an empty state. The physical mechanism for stacking described in this embodiment may be various, as long as multiple logistics apparatuses can be stacked up and down. There are multiple implementations of the physical mechanism for stacking, as long as it can be stacked in a way that compresses space during no-load. After going back to some specific embodiments, various stacking modes can be seen.

A wireless transceiver module for transmitting and receiving a predestinate wireless signal. The wireless transceiver module used in this embodiment is a low-power short-range wireless transceiver module, such as RFID, Bluetooth, and the like. The maximum effective communication distance of the wireless transceiver module is S, the S can be adjusted by adjusting the transmit power of the wireless transmitter module.

An arbiter, configured to determine whether the wireless transceiver module currently receive the predestinate wireless signal from another logistics apparatus and if yes, outputting an electrical signal indicating an empty state, otherwise, outputting an electrical signal indicating a full state. In one embodiment, the arbiter is a microprocessor. In another embodiment, the arbiter is a logic circuit formed by combining a plurality of gate circuits, and the gate circuit comprises an AND gate, an OR gate, a NOT gate, and the like. It is prior art in the art of identification of a specific electrical signal achieved by a logic circuit, and it is not repeated here.

A third wireless transmitter module, electrically coupled to the arbiter and configured to transmit the identification of the logistics apparatus and the signal of the empty or full state output by the arbiter to a cloud server. The third wireless transmitter module only transmits the signal of the empty state or the full state to the cloud server, and does not involve the determination of the empty state or the full state.

In one embodiment, the third wireless transmitter module is a communication module based on a cellular mobile system (such as a 3G, 4G, or 5G communication system). The third wireless transmitter module sends information to a base station, and the base station transfers the information to the cloud server. In one embodiment, the third wireless transmitter module is a Bluetooth module, the third wireless transmitter module establishes connection with a nearby mobile phone, and sends information to the nearby mobile phone, and transfers the information to the cloud server through the mobile phone. In one embodiment, the third wireless transmitter module is a WIFI module, and the third wireless transmitter module sends information to an access point of the WIFI, and forwards the information to the cloud server through the access point.

In the logistics apparatus of this embodiment, in addition to the above modules, various sensor modules may also be included, such as temperature sensors, humidity sensors, air pressure sensors, acceleration sensors, etc., and a location module may be included to obtain the current location information of the logistics apparatus. Information output by various sensor modules and location module can be sent to the cloud server through the third wireless transmitter module.

The wireless transceiver module can be disposed on the base, or on the side plate, or on the top lid of the logistics apparatus. It can be either inside the base or the top lid or the side plate of the logistics apparatus, or can be disposed on the surface of the base, the side plate or the top lid in a surface-attached manner. There are specific requirements for position of the wireless transceiver module in this embodiment, as follows:

when multiple logistics apparatuses are stacked in the empty state, the linear distance between the wireless transceiver modules of two adjacent logistics apparatuses is less than S;

when multiple logistics apparatuses are in the full state, the linear distance between the wireless transceiver modules of two adjacent logistics apparatuses is greater than S.

In the above conditions, the relationship between the linear distance and S of the wireless transmitter module in the stacked and non-stacked state is significant. In order to meet the above conditions, the linear distance in stacked and non-stacked state can be adjusted by adjusting the disposed position of the wireless transmitter module on the logistics apparatus, or S can be adjusted by selecting the communication mode of the wireless module and the transmission power of the wireless module.

Here are some specific embodiments of stackable logistics apparatuses.

Embodiment 5, Sleeve Container without Lid-Reverse Sleeve Container

Figure 7:
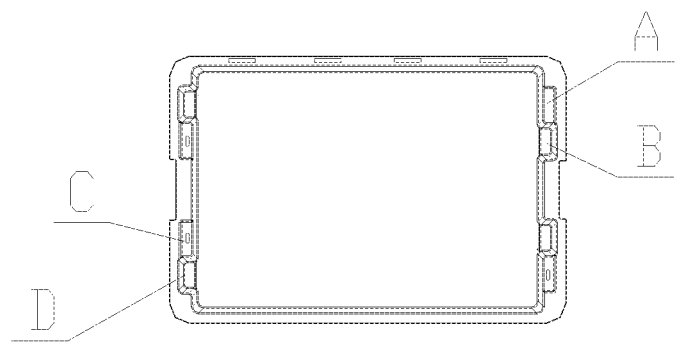
FIG. 7 schematically shows a reverse sleeve container with 4 slots according to the third embodiment of the present invention.

FIG. 7 is a schematic diagram of a reverse sleeve container with 4 kinds of slots for stacking; A represents a wide-shallow slot, B represents a narrow-deep slot, C represents a narrow-shallow slot, D represents a wide-deep slot. When the upper container is stacking in the forward direction, the slot B of the upper container enters into the slot B of the lower container and the slot D of the upper container enters into the slot D of the lower container, which is stacked in the empty state and has high stacking density. When the upper container is stacking upside down, the slot B of the upper container enters into the slot C of the lower container and the slot D of the upper container enters into the slot A of the lower container, that is stacked in the full state and there is storage space between two adjacent containers.

Figure 8:
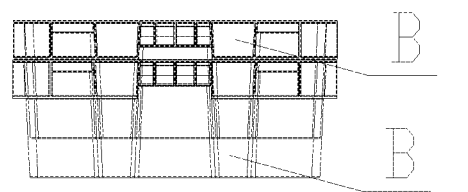
FIG. 8 schematically shows that reverse sleeve containers are stacked in the empty and full state according to the third embodiment of the present invention.
Figure 8:
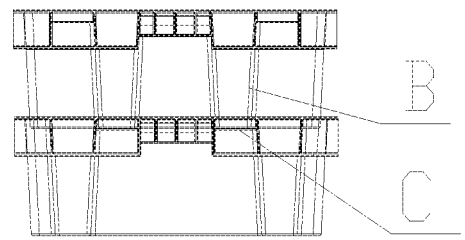
Figure 8:
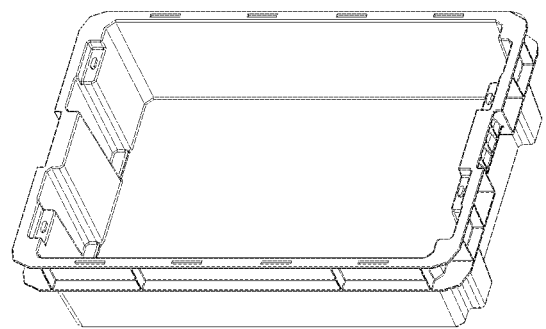

The upper part of FIG. 8 is a side view of the reverse sleeve containers when they are nested together in the empty state, the middle part is a side view of the reverse sleeve containers when they are nested together in the full state, and the lower part is a perspective view of the reverse sleeve container.

In a preferred embodiment, a low-power short-range wireless transceiver module is disposed at the center of the base plate of each reverse sleeve containers (in the base plate or attached to surface of the bottom). It can be seen from the upper and middle parts of FIG. 8 that the distance between the base plates of the reverse sleeve containers stacked together in the empty state and full state is significantly different. The distance between the base plates of two reverse sleeve containers is K in the empty state (the distance of the base plates is equivalent to the distance of the wireless transmitter modules on the base plate), and the distance between the base plates of the two reverse sleeve containers is M in the full state, then K<S<M should be satisfied.

Embodiment 6, Mechanism with Ring-Basket with Ring

Figure 6:
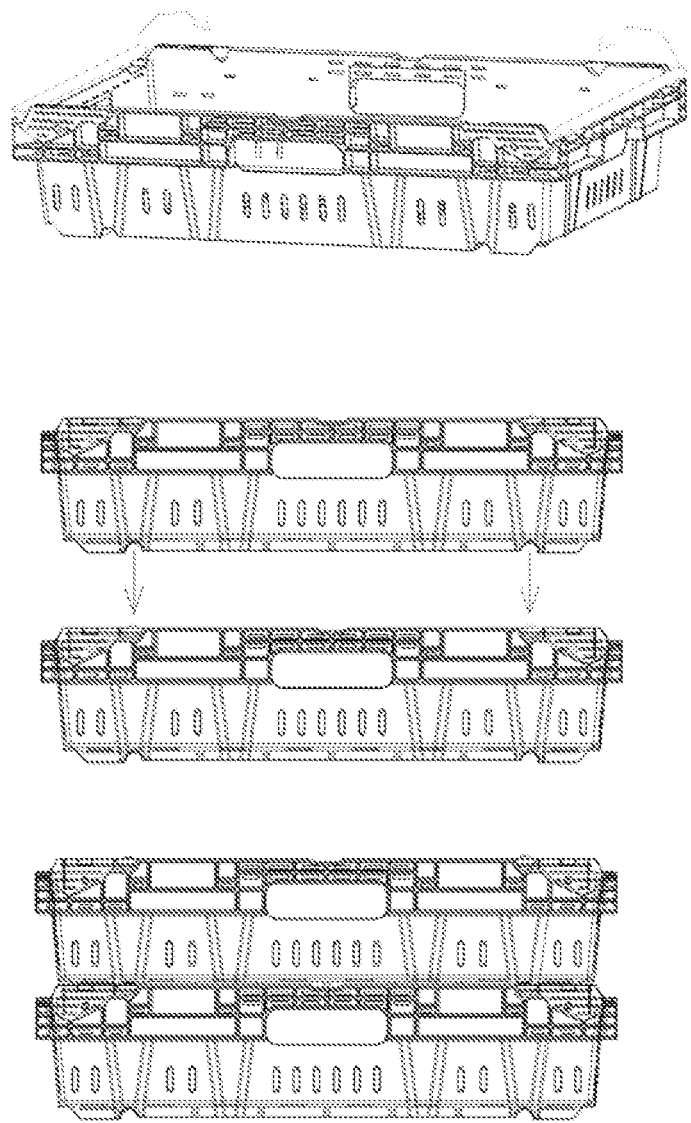
FIG. 6 schematically shows mechanism of a basket with ring and that baskets are stacked in the empty state according to the third embodiment of the present invention.

FIG. 6 is a schematic diagram of a stacked (nested) manner of the basket with ring. The upper part of FIG. 6 is a perspective view of the basket with ring, the middle part is a schematic diagram of stacked direction of two baskets with ring, and the lower part of FIG. 6 is a schematic diagram after two baskets with ring are stacked in the empty state. The wireless transceiver module can be disposed on the base plate of the basket with ring (the effect of anti-interference of peripheral apparatuses is better when disposed in the middle of the base plate), or disposed on the side plate of the basket with ring.

Normally, the baskets with ring can be stacked in the empty state in a manner shown in FIG. 6, and the distance (K) between the two wireless transceiver modules of two baskets with ring is relatively short. The baskets with ring are not stacked when holding cargo (for example, placed on a supermarket shelf), and the distance (M) between the two wireless transceiver modules of two baskets with ring is relatively long, and then K<S<M should be satisfied.

Embodiment 7, Nestable Logistics Apparatus with a Lid

Figure 9:
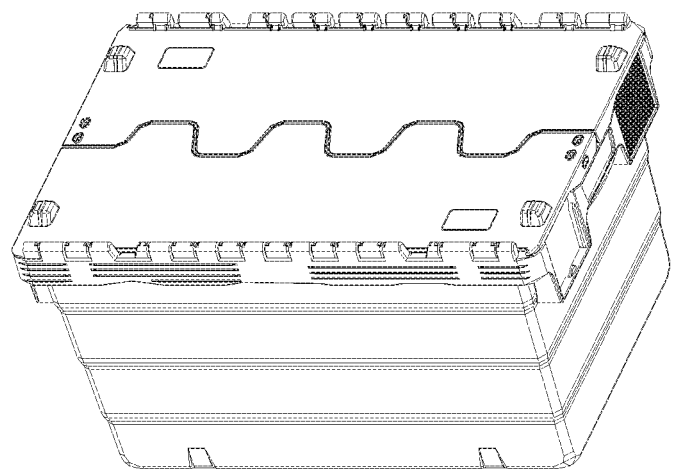
FIG. 9 schematically shows a stackable logistics apparatus with a lid according to the third embodiment of the present invention.
Figure 10:
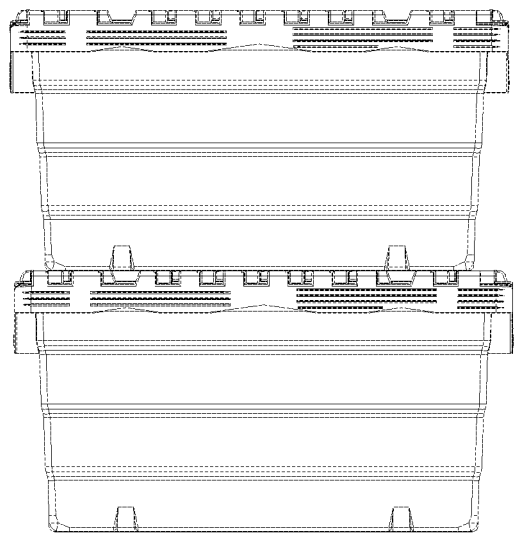
FIG. 10 schematically shows that stackable logistics apparatuses with lid are stacked in the empty and full state according to the third embodiment of the present invention.
Figure 10:
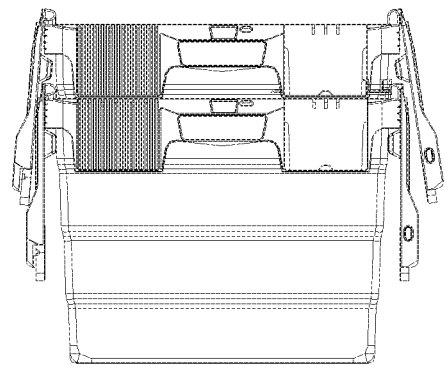

FIG. 9 is a schematic diagram of a perspective view of a nestable logistics apparatus with a lid. The upper part of FIG. 10 is a side view of the logistics apparatuses stacked in the full state, and the lower part of FIG. 10 is a side view of the logistics apparatuses stacked in the nested manner in the empty state. In the nested manner, the lids of each logistics apparatuses can be stacked together somewhere.

Preferably, the wireless transceiver module is disposed at a central portion of the base of each logistics apparatus. It can be seen from the upper and lower parts of FIG. 10 that the distance between the base plates of the logistics apparatuses stacked together in the empty state and full state is significantly different. The distance between base plates of two logistics apparatuses is K in the empty state (the distance of the base plates is equivalent to the distance of the wireless transmitter modules on the base plate), and the distance between base plates of the two logistics apparatuses is M in the full state, then K<S<M should be satisfied.

In another embodiment, the wireless transceiver module of the logistics apparatus with a lid can also be disposed on the side plate (for example, position 101 in FIG. 10).

Embodiment 8, Non-Nested Pallet (Non-Precision Placed)-Standard Pallet

Figure 5:
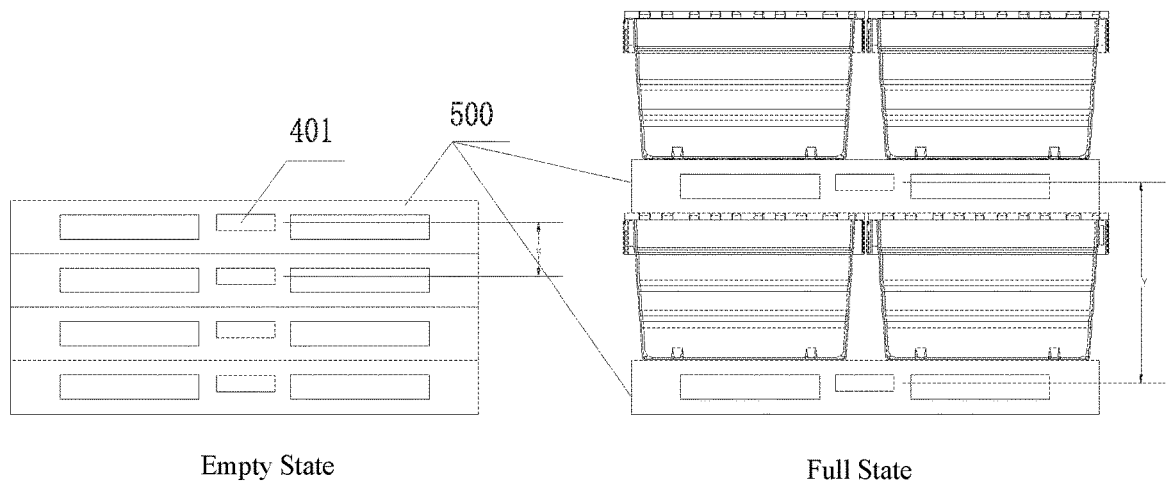
FIG. 5 schematically shows that non-nested pallets are stacked in the empty and full state according to the third embodiment of the present invention.

FIG. 5 schematically shows different stacked manners of the non-precision placed standard pallets stacked in the empty and full state. Wherein, the left part of FIG. 5 is a schematic diagram of the pallets stacked in the empty state, and the right part of FIG. 5 is a schematic diagram of the pallets stacked in the full state. It can be seen that the pallets are stacked with cargo in the full state, while the pallets are directly stacked without cargo in the empty state. Because the pallet has only one base, the wireless transceiver module is disposed on the base (preferably, it can be disposed in the center of the base). It can be clearly seen from FIG. 5 that the distance (K) between the wireless transceiver modules of each pallets relatively short when directly stacked in the empty state and the distance (M) between the wireless transmitter modules of each pallet is relatively long when loaded with cargo in the full state, then K<S<M should be satisfied.

Embodiment 9, Nested Pallet (Precision Placed)

Figure 14:
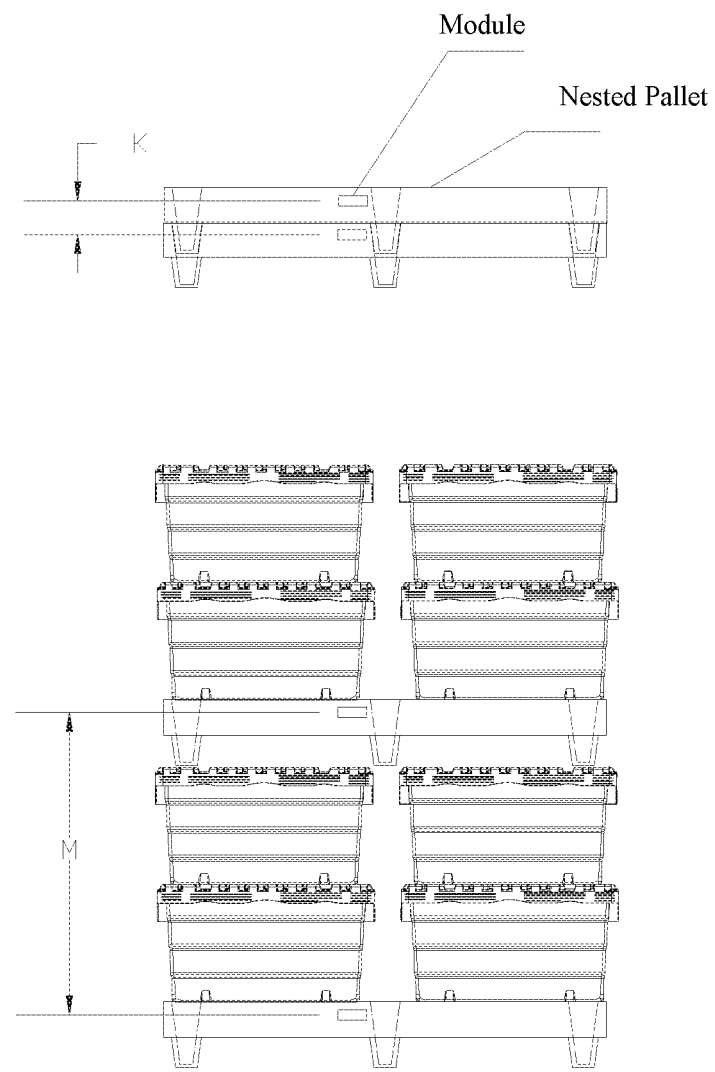
FIG. 14 schematically shows that stackable pallets are stacked in the empty and full state according to the third embodiment of the present invention.

The upper part of FIG. 14 a schematic diagram of stacked manner of the precision placed pallets stacked in the empty state. The pallets in the empty state can be accurately stacked up and down using the mechanisms for stacking. Precision means that placement manner of the pallets nested together are almost exactly the same way.

The lower part of FIG. 14 a schematic diagram of stacked manner of the precision placed pallets stacked in the full state, and cargo (such as other types of logistics apparatuses) are placed between the pallets.

It can be clearly seen from FIG. 14 that the distance (K) between the wireless transceiver modules of each pallet is relatively short when directly stacked in the empty state and the distance (M) between the wireless transmitter modules of each pallet is relatively long when loaded with cargo in the full state, then K<S<M should be satisfied.

The fourth embodiment of the present application relates to a method for identifying empty/full state of a logistics apparatus. The logistics apparatus used in this embodiment is the logistics apparatus described in the third embodiment. The method comprises the following steps:

transmitting a predestinate wireless signal by the wireless transceiver module;

determining whether the wireless transceiver module can currently receive the predestinate wireless signal from another logistics apparatus, if it can be received, the state of the logistics apparatus is determined to be empty, otherwise the state of the logistics is determined to be full. Wherein the logistics apparatus refers to a logistics apparatus in which the wireless transmitter module is disposed.

Transmitting the identification of the logistics apparatus and the signal of the empty or full state output by the arbiter to a cloud server by the third wireless transceiver module.

It should be noted that in the application documents of the present patent, relational terms such as first and second, etc. are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a plurality of elements includes not only those elements but also Other elements, or elements that are inherent to such a process, method, item, or device. Without more restrictions, an element that is defined by the phrase "comprising a" does not exclude the presence of the same element in the process, method, item, or device that comprises the element. In the application file of this patent, if it is mentioned that an action is performed according to an element, it means the meaning of performing the action at least according to the element, and includes two cases: the behavior is performed only on the basis of the element, and the behavior is performed based on the element and other elements.

All documents referred to in this application are considered to be included in the disclosure of the present application as a whole, so as to serve as a basis for modification as necessary. In addition, it should be understood that various changes and modifications may be made by those skilled in the art after reading the above disclosure of the present application.

What is claimed is:

1. A logistics apparatus, comprising:
a physical mechanism for stacking, such that the logistics apparatus can be stacked in an empty state;
a wireless transceiver module, disposed on a base or a side plate or a lid of the apparatus; the wireless transceiver module is configured to transmit wireless signal and receive wireless signal from the wireless transceiver module disposed on other apparatuses;
an arbiter, coupled to the wireless transceiver module and configured to detect whether the wireless transceiver module currently receives a wireless signal from another logistics apparatus and output an electrical signal indicating the result;
wherein the maximum effective communication distance of the wireless transceiver module is S, and disposed position of the wireless transceiver module satisfies following conditions:
when multiple logistics apparatuses are stacked in the empty state, the linear distance between the wireless transceiver modules of two adjacent logistics apparatuses is less than S;
when multiple logistics apparatuses are in the full state, the linear distance between the wireless transceiver modules of two adjacent logistics apparatuses is greater than S.

2. The logistics apparatus according to claim 1, wherein the logistics apparatus is a conventional pallet, and the wireless transceiver module is disposed in a central portion at the bottom of the pallet.

3. The logistics apparatus according to claim 1, wherein the logistics apparatus is a recyclable turnover box, or a reverse sleeve container without lid, or a basket with ring, or a nested pallet, the physical mechanism for stacking enables the logistics apparatus to be nested, and the wireless transceiver module is disposed at the center of the base of the recyclable turnover box.

4. The logistics apparatus according to claim 1, which further comprises a third wireless transmitter module, which is electrically coupled to the arbiter and configured to transmit the identification of the logistics apparatus and the signal of the empty or full state output by the arbiter to a cloud server.

* * * * *